June 23, 1959  F. M. BEEGLE  2,891,417
SPEED-MAINTAINING DEVICE
Filed Aug. 28, 1957
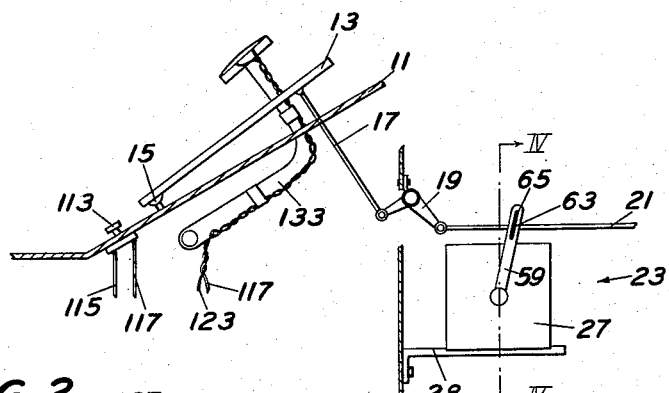
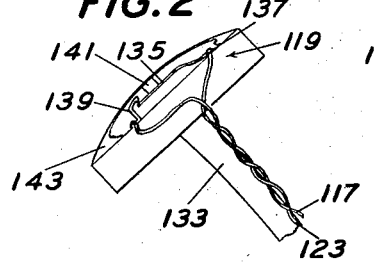
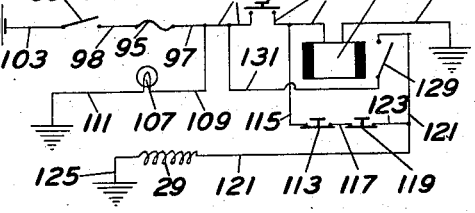
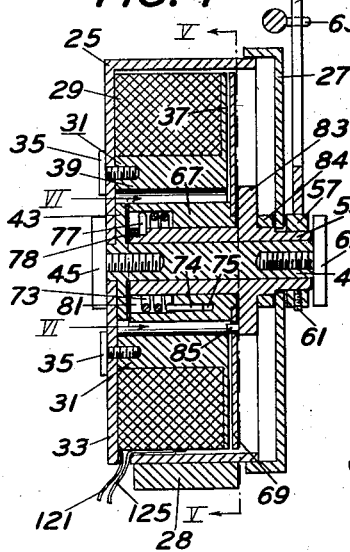
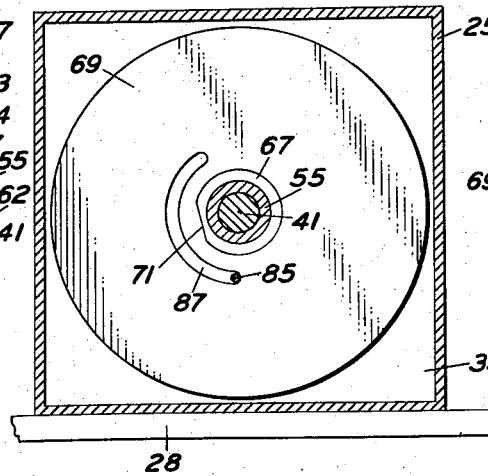
INVENTOR.
FRANCIS M. BEEGLE
BY John R. Walker, III
Attorney

United States Patent Office 2,891,417
Patented June 23, 1959

2,891,417

SPEED-MAINTAINING DEVICE

Francis M. Beegle, Shelby County, Tenn.

Application August 28, 1957, Serial No. 680,746

6 Claims. (Cl. 74—513)

This invention relates to a speed maintaining device adapted for use with the accelerator of an automobile or the like.

The speed of present-day automobiles, trucks, and the like is controlled by accelerators including a foot-operated accelerator pedal. In the operation of the vehicle, particularly on long trips, the driver's foot becomes tired in maintaining pressure on the foot pedal. Therefore, the present invention is directed towards providing means for holding the accelerator at a selected position so that the driver may remove his foot from the pedal. Additionally, the present invention is directed towards overcoming many disadvantages heretofore present in devices of this same general character by providing a speed-control device which is compact in construction, simple to install, and which is safe in operation.

One of the objects of the present invention is to provide a speed-maintaining device of novel construction which is adapted to be used with the accelerator of an automobile or the like to control same.

A further object is to provide such a device which permits the speed of the vehicle to be advanced suddenly when needed, as for passing, without having to release the holding means whereby safety in operation is provided.

A further object is to provide such a device in which the previous speed is automatically resumed after the need for such a sudden speed advance has ended.

A further object is to provide such a speed-maintaining device comprising a cylinder rotatably mounted in a housing and connected to the accelerator of the vehicle for rotation thereby, a brake plate rotatably mounted on said cylinder, resilient coupling means connecting said cylinder to said brake plate whereby rotation of the cylinder by said accelerator is effective to rotate said brake plate, electromagnetic plate adjacent said brake means for stopping the brake plate upon energizing of the electromagnetic means, limiting means interposed between said brake plate and said cylinder for limiting rotation of said cylinder relative to said brake plate in one direction and permitting rotation against the force of said resilient coupling means in the opposite direction whereby said device is effective to hold said accelerator when said electromagnetic means is energized and yet to permit advancement of the accelerator beyond such a held disposition.

A further object is generally to improve the design and construction of speed-maintaining devices.

The means by which the foregoing and other objects of the present invention are accomplished and the manner of their accomplishment will be readily understood from the following specification upon reference to the accompanying drawings, in which:

Fig. 1 is a cross-sectional view of the floor board of an automobile having a conventional accelerator and brake pedal.

Fig. 2 is an enlarged fragmentary side elevational view of the brake pedal of the automobile with parts broken away for purposes of illustration.

Fig. 3 is a diagrammatic view of the wiring of the device of the present invention.

Fig. 4 is a further enlarged cross-sectional view taken as on the line IV—IV of Fig. 1.

Fig. 5 is a cross-sectional view taken as on the line V—V of Fig. 4.

Fig. 6 is a fragmentary cross-sectional view taken as on the line VI—VI of Fig. 4.

Referring now to the drawings in which the various parts are indicated by numerals, in Fig. 1 is shown a conventional floor board 11 of an automobile with the conventional accelerator pedal 13 pivotally connected thereto as at 15. The usual rod 17 is connected adjacent the upper end of the pedal and extends downwardly through an aperture in the floor board to its point of hinged connection with one arm of a bell crank 19, the other arm of which is connected to a rod 21 that extends to the throttle and operates in the usual manner. Although the above-described conventional accelerator means is of the type in which rod 21 moves lengthwise to control the throttle, it will be understood that the present invention is equally adaptable to automobiles having accelerator means which rotate to control the throttle rather than moving lengthwise.

The speed-maintaining device 23 of the present invention comprises a box-like housing 25 open at one end and having a cover 27 over the open end thereof and removably held thereon as by screws or the like. Suitable supporting means, as a bracket 28, is provided for supporting speed-maintaining device 23.

Interiorly of housing 25 electro-magnetic means, as a coil 29, is provided. An annular core 31 extends through the center of coil 29 and is anchored to the closed end 33 of housing 25 as by means of screws 35 extending through apertures in the housing and threadedly engaged in threaded sockets in core 31. Core 31 is provided with flanges 37 extending outwardly from one end of an annular central portion 39 of the core. Thus, as will be observed in Fig. 4, coil 29 is mounted around central portion 39 with flanges 37 extending along one face of the coil to hold it in place.

A stationary shaft 41 having a collar 43 adjacent one end thereof extends axially of housing 25 and through the bore of core 31 and coil 29. One end of stationary shaft 41 is fixedly mounted to closed end 33 with a small section of shaft 41 extending through an aperture in closed end 33 and with collar 43 being anchored against the interior of the closed end by means of a screw 45 threadedly engaged in a threaded socket in the end of stationary shaft 41 and with the head of screw 45 engaging the exterior of closed end 33. The opposite end of stationary shaft 41 extends through a centrally disposed aperture in cover 27.

A cylinder 55 is rotatably mounted on stationary shaft 41 with the shaft extending therethrough. Cylinder 55 preferably extends substantially from collar 43 to the end of stationary shaft 41, thereby covering a major portion of the stationary shaft. The end of cylinder 55 opposite from collar 43 extends beyond cover 27 through an aperture therein and to the outside, upon which end is mounted arm means comprising an annular base 57 and an elongated arm member 59 fixedly attached to annular base 57 and projecting therefrom. Annular base 57 is adjustable and fixedly secured to cylinder 55 as by means of a set screw 61. A screw 62 is threadedly engaged in a threaded aperture in the end of shaft 41 adjacent base 57. The head of screw 62 overlaps the end of cylinder 55 whereby the cylinder is held against removal from shaft 41 by screw 62. The upper end of arm member 59 is secured to the accelerator means of the automobile with which it is used for rotation of the arm member by the accelerator means. Thus, in the present drawings is shown the upper end of arm 59 secured to rod 21 as by a pin 63 fixedly secured to rod 21 and extending through an elongated slot 65 provided in arm 59. Thus, it will be understood that lengthwise movement of rod 21 will cause arm member 59 to swing and to rotate cylinder 55.

Rotatably mounted on cylinder 55 is a brake means which comprises a hub 67 and a brake plate preferably in the form of a disc 69 attached adjacent one end of the hub for conjoint rotation therewith. The end of hub 67 adjacent disc 69 is reduced in diameter and is cylindrical in shape except for a segment thereof which is flat as at 71. The above-described shaped end of hub 67 fits into a correspondingly shaped central bore in disc 69, whereby disc 69 and hub 67 are keyed together for conjoint rotation. Disc 69 extends outwardly from hub 67 over the flanges 37 of core 31 and are disposed closely adjacent thereto but spaced therefrom, whereby when coil 29 is energized disc 69 will be attracted thereby and held against rotation.

Suitable resilient coupling means, as a helical spring 73, couples disc 69 and hub 67 together in the following manner: The end of spring 73 to the right, as viewed in Fig. 4, which for convenience we will call the inner end, is bent substantially parallel to the longitudinal axis of the spring, as at 74, and is received in a socket 75 provided in hub 67, thereby securing the inner end of the spring to the hub. The outer end of spring 73 is bent towards cylinder 55, as at 77, as best illustrated in Fig. 6, which bent end 77 fits into a socket in cylinder 55 and is removably held therein by a set screw 78 to secure the outer end of the spring to the cylinder. Thus, it will be seen, as best illustrated in Fig. 4, spring 73 extends over the end of cylinder 55 and is housed in a socket 81 provided in the end of hub 67. Spring 73 is disposed so that if hub 67 is held stationary and cylinder 55 is rotated towards an advanced throttle position of the accelerator, that is, clockwise as viewed in Fig. 1, spring 73 will be tensioned. Additionally, it will be apparent that due to the coupling effect of spring 73, if unrestrained hub 67 will follow the rotational movements of cylinder 55 with substantially no tensioning of spring 73. Thus, as will be understood more fully in the hereinafter-described operation of the device, there is no spring tension to influence the accelerator in any way as a result of the speed-maintaining device 23 being connected thereto except during a condition of speed advance when coil 29 is energized, at which time the force of spring 73 tends to urge the accelerator towards idle position. It should be noted at this point that this is one of the advantages of the speed-maintaining device of the present invention over devices of the same general character which employ a spring acting against the accelerator in various ways during the normal course of operation of the accelerator.

Cylinder 55 is provided with a collar 83 integrally a part thereof and intermediate the ends thereof. Collar 83 overlaps the end of hub 67 and overlaps a portion of disc 69. An oil seal ring 84 is provided on cylinder 55 between collar 83 and cover 27.

Limiting means is provided between disc 69 and cylinder 55. Said limiting means comprises a pin 85 fixedly attached to and projecting from collar 83 and extending into an arcuate slot 87 provided in disc 69. The relationship of pin 85, arcuate slot 87, and spring 73 is such that the normal position of pin 85 is as best illustrated in Fig. 5, wherein it will be seen pin 85 is disposed at one end of slot 87. When pin 85 is in said normal position spring 73 is preferably slightly tensioned. By said normal position is meant the disposition into which spring 73 urges pin 85 relative to slot 87 when cylinder 55 and hub 67 are permitted to rotate unrestrained relative to one another. This is in contrast to a disposition wherein disc 69 is held by coil 29 and cylinder 55 is rotated relative thereto. It will be understood that when this last-mentioned condition occurs, pin 85 will travel clockwise as viewed in Fig. 5 relative to arcuate slot 87 and spring 73 will be further tensioned. From the foregoing description, it will be apparent that from said normal position rotation of cylinder 55 in a counterclockwise direction relative to disc 69, as viewed in Fig. 5, is limited by pin 85 abutting disc 69 in slot 87 and rotation of cylinder 55 is permitted in a clockwise direction, as viewed in Fig. 5, since the pin is free to travel in the arcuate slot. The arc of arcuate slot 87 is preferably substantially 150 degrees and in connecting the device of the present invention with the accelerator means of an automobile, the linkage is preferably such that the swing of arm member 59 will be substantially 150 degrees, whereby with coil 29 energized when accelerator pedal 13 is in an "at rest" position, the pedal may be depressed to a full throttle position which will advance pin 85 to the opposite end of arcuate slot 87 from that above described.

Referring now to the diagrammatic view in Fig. 3, coil 29 is connected electrically as follows: A lead 89 connects one end of the coil of relay 90 to ground, the other end of the relay coil being connected to one contact of a normally open push-button switch 91 by means of a lead 93. The other contact of switch 91 is connected to a fuse 95 by a lead 97. Fuse 95 is connected, in turn, to a main switch 99 by a lead 98 which, in turn, is connected to a battery 101 by a lead 103. The other pole of battery 101 is connected to ground as by a lead 105. An indicator light 107 is connected by a lead 109 to lead 97, the other terminal of the indicator light being connected to ground by a lead 111. One contact of a normally closed foot-operated switch 113 is connected by a lead 115 to a lead 93. The other contact is connected as by a lead 117 to one contact of a normally closed cut-out switch 119. The other contact of switch 119 is connected to a lead 121 by a lead 123. Lead 121 is connected to one end of coil 29 and the other end of the coil is connected to ground as by a lead 125. Additionally, lead 121 is connected to one contact of a normally open relay switch 129. Switch 129 is associated with relay 90 and is biased to an open position and closed when relay 90 is energized. The other contact of switch 129 is connected to lead 97 as by a lead 131.

Switch 119 is mounted on the conventional brake pedal 133 of the automobile and constructed so that when the driver presses on the brake pedal the switch 119 will be opened. Thus, as best illustrated in Fig. 2, switch 119 comprises a resilient and conductive arm 135 fixedly attached at one end to pedal 133, as at 137, and insulated therefrom. In the "at rest" position, arm 135 is in contact with a conductor 139 which is similarly attached to pedal 133 and insulated therefrom. A button 141 is fixedly provided on arm 135 and pedal 133 is covered with a flexible covering 143. Thus, when the driver presses down on the brake pedal, button 141 will be pressed downwardly carrying with it arm 135 to separate the arm from contact 139 and open the switch.

Switch 113 is mounted on floor board 11, as best illustrated in Fig. 1. Switches 91 and 99 are located in any suitable position in the automobile convenient for the driver, as for example on the dashboard.

The operation of the speed-maintaining device 23 of the present invention is as follows: First, the main switch 99 is closed to place the electrical circuit in condition for operation. Next, the driver establishes the speed which he desires to maintain by pressure on accelerator pedal 13. After such a speed has been reached, push-button 91 is then manually and momentarily closed, which energizes relay 90 and closes switch 129 to complete the circuit to coil 29, causing the energization thereof. It will be understood that when switch 91 is pressed a holding circuit will be set up to relay 90 whereby the relay will remain energized although switch 91 has returned to the open position. Said holding circuit includes lead 105, battery 101, lead 103, switch 99, lead 98, fuse 95, lead 97, lead 131, switch 129, lead 121, lead 123, switch 119, lead 117, switch 113, lead 115, lead 93, coil of relay 90, and lead 89. The aforementioned energizing of coil 29, in turn, causes the disc 69 to be held in a stationary position, corresponding to the speed at which the button 91 was pressed. The driver's foot may then be removed from accelerator pedal 13 and the accelerator pedal will remain depressed so that the automobile will continue at the same speed at which the button 91 was pressed. It will be understood that pedal 13 will remain at the above-described position since cylinder 55 will be held stationary through means of pin 85 abutting disc 69 at the end of arcuate slot 87, which stationary disposition of cylinder 55 will hold arm member 59 stationary and, in turn, hold rod 21 stationary. Accelerator pedal 13 may be depressed to advance the throttle without de-energizing coil 29. This is particularly advantageous when passing or when a sudden burst of speed is required and provides a unique safety feature heretofore not present in other devices of this general character. After the above-mentioned speed advance has ended, the driver may release his foot from the pedal 13 and the speed-maintaining device will once again hold the accelerator at the position for the previously selected speed.

When it is desired to release the speed-maintaining device 23, it is only necessary for the driver to open either switch 113, by pressure thereon with his foot, or switch 119, by applying pressure to the brake pedal 133. Opening of either switches 113 or 119 causes the previously described holding circuit to be broken and the de-energizing of relay 90, which, in turn, opens switch 129, thereby de-energizing coil 29 and releasing disc 69.

From the foregoing description, it is apparent that an efficient, simple, and unique speed-maintaining device is provided which is easily attachable to the existing accelerator means of automobiles. Additionally, it is apparent that a safe speed-maintaining device is provided in which a sudden increase of speed may be effected and which in the normal operation of the accelerator means of the automobile there is no spring tension to influence the accelerator means in any way.

I claim:

1. The combination with an accelerator means, speed control means for the accelerator means comprising a housing, electromagnetic means mounted in said housing, energizing means connected to said electromagnetic means, a shaft mounted in said housing and extending through said electromagnetic means, a cylinder rotatably mounted on said shaft, an arm fixedly mounted on said cylinder adjacent one end and coupled to the accelerator means whereby movement of the accelerator means is effective to rotate said cylinder, a brake plate rotatably mounted on said cylinder, a helical spring attached adjacent one end to said cylinder and attached adjacent the other end to said brake plate whereby rotation of said cylinder is effective to rotate said brake plate, said brake plate being disposed adjacent said electromagnetic means and magnetically attracted into frictional engagement therewith when said electromagnetic means is energized whereby the energizing of said electromagnetic means is effective to hold said brake plate against rotation, said cylinder being rotatable relative to said brake plate against the force of said spring when said brake plate is held by said electromagnetic means, said brake plate being provided with a slot therein, a pin fixedly attached to said cylinder and extending into said slot, said pin and said slot being arranged to limit rotation of said cylinder relative to said brake plate in one direction and to permit rotation against said spring of said cylinder relative to said brake plate in the opposite direction when said brake plate is held by said electromagnetic means.

2. The combination with an accelerator means, speed-maintaining means for the accelerator means comprising a housing, electromagnetic means mounted in said housing, a shaft mounted in said housing and extending through said electromagnetic means, a cylinder rotatably mounted on said shaft, an arm fixedly mounted on said cylinder adjacent one end and coupled to the accelerator means whereby movement of the accelerator means is effective to rotate said cylinder, a brake plate rotatably mounted on said cylinder, means coupling said cylinder and said brake plate whereby rotation of said cylinder is effective to rotate said brake plate, said brake plate being disposed adjacent said electromagnetic means and magnetically attracted into frictional engagement therewith when said electromagnetic means is energized whereby the energizing of said electromagnetic means is effective to hold said brake plate against rotation, said coupling means being resilient whereby said cylinder is rotatable relative to said brake plate when said brake plate is held by said electromagnetic means, said brake plate being provided with a slot therein, a pin fixedly attached to said cylinder and extending into said slot, said pin and said slot being arranged to limit rotation of said cylinder relative to said brake plate in one direction and to permit rotation against said coupling means of said cylinder relative to said brake plate in the opposite direction when said brake plate is held by said electromagnetic means.

3. The combination with an accelerator of speed-maintaining means for the accelerator comprising a housing, holding means mounted in said housing, a cylinder rotatably mounted in said housing, an arm fixedly mounted on said cylinder adjacent one end and coupled to the accelerator whereby movement of the accelerator is effective to rotate said cylinder, a brake plate rotatably mounted on said cylinder, means coupling said cylinder and said brake plate whereby rotation of said cylinder is effective to rotate said brake plate, said holding means being arranged to selectively hold said brake plate against rotation and release said brake plate for rotation, said coupling means being resilient whereby said cylinder is rotatable relative to said brake plate when said brake plate is held by said holding means, limiting means interposed between said cylinder and said brake plate, said limiting means being arranged to limit rotation of said cylinder relative to said brake plate in one direction and to permit rotation against said coupling means of said cylinder relative to said brake plate in the opposite direction when said brake plate is held by said holding means.

4. A speed maintaining device comprising a housing, electromagnetic means mounted in said housing, a cylinder rotatably mounted in said housing, coupling means fixedly mounted on said cylinder and adapted to be coupled to an accelerator whereby when the cylinder is so connected to an accelerator the accelerator is effective to rotate said cylinder, a brake plate rotatably mounted in said housing, means coupling said cylinder and said brake plate whereby rotation of said cylinder is effective to rotate said brake plate, said brake plate being disposed adjacent said electromagnetic means and magnetically attracted into frictional engagement therewith, when said electromagnetic means is energized whereby the energizing of said electromagnetic means is effective to hold said brake plate against rotation, said coupling means being resilient whereby said cylinder is rotatable relative to said brake plate when said brake plate is held by said electromagnetic means, limiting means interposed between said cylinder and said brake plate, said limiting means being arranged to limit rotation of said cylinder relative to said brake plate in one direction and to permit rotation against said coupling means of said cylinder relative to said brake plate in the opposite direction when said brake plate is held by said electromagnetic means.

5. The combination with an accelerator of speed-maintaining means for the accelerator comprising a housing, electromagnetic means mounted in said housing, energizing and de-energizing means for said electromagnetic means, a cylinder rotatably mounted in said housing, means coupling said accelerator and said cylinder for rotation of said cylinder conjointly with movement of said accelerator, a hub rotatably mounted on said cylinder, a disc fixedly mounted on said hub adjacent one end thereof for conjoint rotation therewith, said disc being adjacent said electromagnetic means and magnetically attracted thereby when said electromagnetic means is energized whereby the energizing of said electromagnetic means is effective to hold said hub and disc against rotation, one end of said hub being provided with a socket, a helical spring surrounding a portion of said cylinder and received in said socket, said spring being attached adjacent one end thereof to said cylinder and being attached adjacent the other end thereof to said hub whereby rotation of said cylinder is effective to rotate said hub and said disc when said electromagnetic means is de-energized, said disc being provided with an arcuate slot having an arc substantially corresponding to the degrees of rotation of said cylinder when said accelerator is rotated from its "at rest" position to a fully advanced position, said cylinder including a collar integrally formed intermediate the ends of the cylinder, a pin fixedly attached to and projecting from said collar and extending into said arcuate slot; said spring, said pin and said slot being arranged so that when said disc is unrestrained by said electromagnetic means said pin is disposed adjacent one end of said slot and when said disc is held by said electromagnetic means said cylinder is free to rotate in one direction relative to said disc upon advance of said accelerator to carry said pin towards the other end of said slot and tension said spring, whereby when said accelerator is released said cylinder will rotate in the opposite direction under influence of said spring to carry said accelerator to its previous position before advancement.

6. The combination with an accelerator of speed-maintaining means for the accelerator comprising a housing, electromagnetic means mounted in said housing, energizing and de-energizing means for said electromagnetic means, a cylinder rotatably mounted in said housing, means coupling said accelerator and said cylinder for rotation of said cylinder conjointly with movement of said accelerator, a brake plate rotatably mounted in said housing, said brake plate being adjacent said electromagnetic means and magnetically attracted into frictional engagement therewith when said electromagnetic means is energized whereby the energizing of said electromagnetic means is effective to hold said brake plate against rotation, a helical spring attached adjacent one end thereof to said cylinder and being attached adjacent the other end thereof to said brake plate whereby rotation of said cylinder is effective to rotate said brake plate when said electromagnetic means is de-energized, said brake plate being provided with an arcuate slot having an arc substantially corresponding to the degrees of rotation of said cylinder when said accelerator is rotated from its "at rest" position to a fully advanced position, a pin fixedly attached to and projecting from said cylinder and extending into said arcuate slot; said spring, said pin and said slot being arranged so that when said brake plate and said cylinder are free to rotate relative to one another said pin is disposed adjacent one end of said slot and when said brake plate is held by said electromagnetic means said cylinder is free to rotate in one direction relative to said brake plate upon advance of said accelerator to carry said pin towards the other end of said slot and tension said spring, whereby when said accelerator is released said cylinder will rotate in the opposite direction under influence of said spring to carry said accelerator to its previous position before advancement.

References Cited in the file of this patent

UNITED STATES PATENTS

| | | |
|---|---|---|
| 2,270,002 | Glick | Jan. 13, 1942 |
| 2,638,016 | Munson | May 12, 1953 |
| 2,765,058 | Struthers | Oct. 2, 1956 |